US008535565B2

(12) United States Patent
Im et al.

(10) Patent No.: US 8,535,565 B2
(45) Date of Patent: Sep. 17, 2013

(54) SOLID SOLUTION PHOSPHORS BASED ON OXYFLUORIDE AND WHITE LIGHT EMITTING DIODES INCLUDING THE PHOSPHORS FOR SOLID STATE WHITE LIGHTING APPLICATIONS (75) Inventors: Won-Bin Im, Gwanju (KR); Ram Seshadri, Goleta, CA (US); Steven P. DenBaars, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 278 days.

(21) Appl. No.: 12/903,889

(22) Filed: Oct. 13, 2010

(65) Prior Publication Data
US 2011/0101272 A1 May 5, 2011

Related U.S. Application Data (60) Provisional application No. 61/256,830, filed on Oct. 30, 2009.

(51) Int. Cl.
C09K 11/86 (2006.01)
C09K 11/64 (2006.01)
H01L 33/00 (2010.01)

(52) U.S. Cl.
USPC ................. 252/301.4 H; 313/503; 257/98

(58) Field of Classification Search
USPC ................. 252/301.4 F, 301.4 R, 301.4 H
See application file for complete search history.

(56) References Cited

U.S. PATENT DOCUMENTS

| 3,014,877 | A | 12/1961 | Ramby et al. | |
|---|---|---|---|---|
| 6,717,353 | B1 | 4/2004 | Mueller et al. | |
| 2001/0001207 | A1 | 5/2001 | Shimizu et al. | |
| 2007/0241666 | A1* | 10/2007 | Jang et al. | 313/503 |
| 2009/0085467 | A1 | 4/2009 | Jang et al. | |
| 2009/0174310 | A1 | 7/2009 | Vogt et al. | |
| 2009/0212314 | A1 | 8/2009 | Im et al. | |
| 2010/0096974 | A1* | 4/2010 | Setlur et al. | 313/487 |
| 2010/0314993 | A1* | 12/2010 | Im et al. | 313/503 |

FOREIGN PATENT DOCUMENTS

| EP | 1296376 | 3/2003 |
|---|---|---|
| EP | 1296383 | 3/2003 |
| EP | 1696016 | 8/2006 |
| KR | 10-2007-0098275 | 9/2007 |
| WO | 98/05078 | 2/1998 |

OTHER PUBLICATIONS

Derwnt abstract for CN 101531902—Sep. 16, 2009.*
Van Krevel, J. et al., "Luminescence properties of rare earth doped α-SiAlON materials," Jan. 1, 2000, pp. 145-157.
Van Krevel, J. et al., "Luminescence properties of terbium-, cerium-, or europium-doped α-SiAlON materials," Journal of Solid State Chemistry, vol. 165, Apr. 26, 2002, pp. 19-24.
Xie, R. et al., "Photoluminescence of rare-earth-doped Ca-α-SiAlON phosphors," Journal of the American Ceramic Society, vol. 88, No. 10, Aug. 19, 2005, pp. 2883-2888.

(Continued)

Primary Examiner — Carol M Koslow
(74) Attorney, Agent, or Firm — Gates & Cooper LLP (57) ABSTRACT Phosphor compositions comprising a solid solution series between $Sr_3AlO_4F$ and $Sr_3SiO_5$ and a solid solution series between $Sr_3AlO_4F$ and $GdSr_2AlO_5$, are disclosed. A white light emitting LED using the phosphor compositions is also disclosed.

9 Claims, 10 Drawing Sheets

(56) References Cited

OTHER PUBLICATIONS

Xie, R. et al., "Photoluminescence of cerium-doped alph-SiAlON materials," Journal of the American Ceramic Society, vol. 87, No. 7, Jul. 1, 2004, pp. 1368-1370.

Jang, H. et al., "Yellow-emitting Sr3SiO5:Ce3+, Li+ phosphor for white-light-emitting diodes and yellow-light-emitting diodes," Applied Physics Letters 90, 041906 (2007).

Prodjosantoso, A.K. et al.: "Cation and anion ordering in the layered oxyfluorides Sr3-xAxAlO4F (A = Ba, Ca)" Journal of Solid State Chemistry, vol. 172, Issue 1, Apr. 2003, p. 89-94.

International Search Report and Written Opinion for International Application No. PCT/US2010/052505 filed on Oct. 13, 2010.

Blasse, G. et al., "Fluorescence of Eu2+-activated silicates," Philips Res. Repts 23, 189-200, 1968.

Chen, Y. et al., "High efficient and low color-temperature white light-emitting diodes with Tb2Al3O12:Ce3+ phosphor," Applied Physics Letters 91, 071117 (2007).

Haranath, D. et al., "Enhanced luminescence of Y3Al5O12:Ce3+ nanophosphor for white light-emitting diodes," Applied Physics Letters 89, 173118 (2006).

Im, W. et al., "A yellow-emitting Ce3+ phosphor, La1-xCexSr2AlO5, for white light-emitting diodes," Applied Physics Letters 93, 091905 (2008).

Jang, H. et al., "Enchancement of red spectral emission intensity of Y3Al5O12:Ce3+ phosphor via Pr co-doping and Tb substitution for the application to white LEDs," Journal of Luminescence 126 (2007) 371-377.

Kasuya, R. et al., "Characteristic optical properties of transparent color conversion film prepared from YAG:Ce3+ nanoparticles," Applied Physics Letters 91, 111916 (2007).

Li, Y. et al., "Luminescence properties of Eu2+-activated alkaline-earth silicon-oxynitride MSi2O2-δN2+2/3 δ (M = Ca, Sr, Ba): A promising class of novel LED conversion phophors," Chem. Mater. 2005, 17,3242-3248.

Lu, C. et al., "Cerium-ion-doped yttrium aluminum garnet nanophosphors prepared through sol-gel pyrolysis for luminescent lighting," Applied Physics Letters, vol. 80, No. 19, May 13, 2002, 3608.

Park, J. et al., "White light-emitting diodes of GaN-based Sr2SiO4:Eu and the luminescent properties," Applied Physics Letters, vol. 82, No. 5, Feb. 3, 2003, 683.

Piao, X. et al., "Preparation of CaAlSiN3:Eu2+ phosphors by the self-propagating high-temperature synthesis and their luminescent properties," Chem. Mater. 2007, 19, 4592-4599.

Saradhi, M. et al., "Photoluminescence studies on Eu2+-activated Li2SrSiO4—A potential orange-yellow phosphor for solid-state lighting," Chem. Mater. 2006, 18, 5267-5272.

Xie, R. et al., "Eu2+-doped Ca-αSiAlON: A yellow phosphor for white light-emitting diodes," Applied Physics Letters, vol. 84, No. 26, Jun. 28, 2004, 5404.

\* cited by examiner

SOLID SOLUTION PHOSPHORS BASED ON OXYFLUORIDE AND WHITE LIGHT EMITTING DIODES INCLUDING THE PHOSPHORS FOR SOLID STATE WHITE LIGHTING APPLICATIONS

CROSS REFERENCE TO RELATED APPLICATIONS

This application claims priority under 35 U.S.C. §119(e) to and commonly-assigned U.S. Provisional Patent Application Ser. No. 61/256,830, entitled "SOLID SOLUTION PHOSPHORS BASED ON OXYFLUORIDE AND WHITE LIGHT EMITTING DIODES INCLUDING THE PHOSPHORS FOR SOLID WHITE LIGHTING APPLICATIONS," filed on Oct. 30, 2009, by Won-Bin Im, Ram Seshadri and Steven P. DenBaars, which application is incorporated by reference herein.

This application is related to the following co-pending and commonly-assigned U.S. patent applications:

U.S. Utility patent application Ser. No. 12/816,939, filed on Jun. 16, 2010 (now U.S. Pat. No. 8,344,611 issued on Jan. 1, 2013), by Won-Bin Im, Ram Seshadri and Steven P. DenBaars, entitled "OXYFLUORIDE PHOSPHORS AND WHITE LIGHT EMITTING DIODES INCLUDING THE OXYFLUORIDE PHOSPHOR FOR SOLID-STATE LIGHTING APPLICATIONS,"which application claims priority under 35 U.S.C. §119(e) to and commonly-assigned U.S. Provisional Patent Application Ser. No. 61/187,411, filed on Jun. 16, 2009, by Won-Bin Im, Ram Seshadri and Steven P. DenBaars, entitled "OXYFLUORIDE PHOSPHORS AND WHITE LIGHT EMITTING DIODES INCLUDING THE OXYFLUORIDE PHOSPHOR FOR SOLID-STATE LIGHTING APPLICATIONS,"and U.S. Utility patent application Ser. No. 12/394,492, filed on Feb. 27, 2009 (now U.S. Pat. No. 8,163,203 issued on Apr. 24, 2012), by Won-Bin Im, Ram Seshadri and Steven P. DenBaars, entitled "YELLOW EMITTING PHOSPHORS BASED ON $Ce^{3+}$-DOPED ALUMINATE AND VIA SOLID SOLUTION FOR SOLID-STATE LIGHTING APPLICATIONS," which application claims the benefit under 35 U.S.C. Section 119(e) of the following and commonly-assigned applications:

U.S. Provisional Patent Application Ser. No. 61/067,297, filed on Feb. 27, 2008, by Won-Bin Im, Ram Seshadri and Steven P. DenBaars, entitled "YELLOW EMITTING $Ce^{3+}$-DOPED ALUMINATE PHOSPHOR AND WHITE LIGHT EMITTING DIODES INCLUDING $Ce^{3+}$-DOPED ALUMINATE PHOSPHOR FOR SOLID-STATE LIGHTING APPLICATIONS,"and U.S. Provisional Patent Application Ser. No. 61/074,281, filed on Jun. 20, 2008, by Won-Bin Im, Ram Seshadri and Steven P. DenBaars, entitled "NEW YELLOW-EMITTING PHOSPHORS VIA SOLID SOLUTION AND WHITE LIGHT EMITTING DIODES INCLUDING NEW YELLOW-EMITTING PHOSPHOR FOR SOLID-STATE LIGHTING APPLICATIONS,"

all of which applications are incorporated by reference herein.

BACKGROUND OF THE INVENTION

1. Field of the Invention

This invention relates to providing new green-emitting and yellow-emitting phosphor powders and white light emitting diodes (LEDs) that include solid solution phosphors.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

For generating white light, most current commercial LED lamps employ yellow-emitting $YAG:Ce^{3+}$ phosphors excited by blue InGaN diodes due to the unsurpassed efficiency such a combination provides [1-3]. However, $YAG:Ce^{3+}$ phosphors have relatively weak emission in the red spectral region, and consequently the color rendering ability has yet to be improved [4-6]. In addition, the output color from $YAG:Ce^{3+}$ phosphors is strongly dependent on temperature and current, which will become a significant problem in high-power LEDs [7]. To overcome these drawbacks, and also to avoid issues associated with intellectual property, there are extensive efforts worldwide to develop new yellow-emitting phosphors for blue-pumped LED applications [8-11] as well as to optimize the existing systems.

Unfortunately, with the exception of $YAG:Ce^{3+}$, there are few phosphor materials for the long ultraviolet (UV) or blue excitation sources. Up to now, no competing yellow phosphor has been found replace to the $YAG:Ce^{3+}$ phosphor. It is necessary to develop new phosphors in terms of phosphor efficiency and color rendering property in the red spectral region.

Thus, in order to address this issue, a new phosphor is required for solid-state lighting. The present invention can be used for white light generation by combining either a near UV-LED (peak emission wavelength $\lambda_{max}$=395 and 405 nm) and red-emitting phosphor, or a near UV-LED and green-orange phosphors, or a near UV-LED and yellow phosphor. The present invention can also be used for white light generation by combining either a blue LED and yellow phosphors, or a blue LED and green-yellow phosphors, or a blue LED and yellow-red phosphors. For this purpose, there are many numbers of different applications.

In the present invention, one of end members, $M_3SiO_5$ (M=Ca, Sr, Ba), was developed by Blasse et al. [12] as a phosphor material for $Eu^{2+}$ ions, and then Jang et al. [13] and patents [14, 15] reported the LED application (Korea Patent No. 2007-98275 and PCT/2009/0085467 respectively). Thus, in this disclosure, the present invention does not cover the end member of $Sr_3SiO_5$ corresponding to z=1.0 in a solid solution series between $Sr_3AlO_4F$ and $Sr_3SiO_5$, $(Sr_{3-x-y}AR_y)(Al_{1-(z+u)}III_uSi_z)O_{4+z}F_{1-z}:Ce^{3+}_x$.

SUMMARY OF THE INVENTION

To overcome the limitations in the prior art described above, and to overcome other limitations that will become apparent upon reading and understanding the present specification, the present invention describes green-emitting and yellow-emitting phosphors based on $Sr_3AlO_4F$ oxyfluoride via solid solution, and a white light emitting diode (LED) including the phosphors. In an attempt to combine some of the attractive properties of the three distinct systems, the present invention synthesized two kinds of solid solution series between the nearly isotypic host compounds via solid solution:

(i) Solid solution series between $Sr_3AlO_4F$ and $Sr_3SiO_5$. The green-emitting phosphors are represented as $(Sr_{3-x-y}AR_y)(Al_{1-(z+u)}III_uSi_z)O_{4+z}F_{1-z}:Ce^{3+}_x$ wherein $0<x\leq0.3$, $0\leq y\leq1$, $0<z<1$, $0<z+u<1$, AR includes at least one element selected from alkaline earth metals in the periodic table, for example, Mg, Ca and Ba, and III includes at least one atom selected from Al, B and Ga.

In one embodiment, x, y, z and u are such that the phosphor composition emits light, having a wavelength between 430 nm and 760 nm and a peak wavelength that is green light, when excited by blue or ultraviolet light having a wavelength between 365 nm and 450 nm, emitted, for example, by an LED that optically pumps the phosphor, wherein the peak wavelength is tunable by varying x, y, z and u. In another embodiment, x, y, z and u are such that the phosphor is used for white light applications in combination with one or more additional phosphors, such as yellow phosphors, green-or-ange phosphors, and yellow-red phosphors. Preferably, the phosphor composition is in a solid solution form and an amount of the solid solution determines the peak wavelength of the light emitted.

The phosphor composition may include an absorbing ion as a sensitizer and charge compensator that absorbs exciting radiation and transfers it to an activator in the phosphor composition, the phosphor composition emits light having a wavelength longer than a wavelength of the exciting radiation, and the sensitizer comprises one or more ions chosen from $Li^+$, $Na^+$ and $K^+$ for the charge compensation.

A method for fabricating the phosphor composition includes the steps of: mixing $CaCO_3$, $SrCO_3$, $BaCO_3$, $Al_2O_3$, $SiO_2$, $SrF_2$, $BaF_2$ and $CeO_2$ in stoichiometric amounts to form a mixture; and heating the mixture between 1000 and 1700° C. in a reduction atmosphere to form the phosphor composition. The heating step may comprise heating the mixture two or more times to achieve higher crystallinity for the phosphor composition as compared to heating the mixture just once, thereby enhancing one or more optical properties of the phosphor composition. The reduction atmosphere is provided by supplying a gas mixture having both nitrogen and hydrogen, and the hydrogen is 2 to 25% by volume such that the hydrogen's volume in the gas mixture is 2-25% of the gas mixture's volume.

(ii) Solid solution series between $Sr_3AlO_4F$ and $GdSr_2AlO_5$. The green-emitting and yellow-emitting phosphors which are represented as $(Sr_{3-(a+b+c)}AR_bGd_{c-d}Ln_d)$ $AlO_{4+c}F_{1-c}:Ce^{3+}_a$ wherein $0<a\leq0.3$, $0\leq b\leq3$, $0<c<1$, $0<d<1$, $0<c-d<1$, $0<a+b+c<3$, AR includes at least one element selected from alkaline earth metals in the periodic table, for example, Mg, Ca and Ba, and Ln includes at least one atom selected from lanthanide on the periodic table, for example, La, Tb and Y.

In one embodiment, a, b, c and d are such that the phosphor composition emits light, having a wavelength between 430 nm and 760 nm and a peak wavelength that is yellow light or green light, when excited by blue or ultraviolet light having a wavelength between 370 nm and 450 nm, emitted, for example, by an LED that optically pumps the phosphor, wherein the peak wavelength is tunable by varying x, y, z and u. In another embodiment, a, b, c and d are such that the phosphor composition is used for white light applications in combination with one or more additional phosphors, such as yellow phosphors, green-orange phosphors, and yellow-red phosphors, wherein the LED optically pumps the phosphor composition and the additional phosphors. Preferably, the phosphor composition is in a solid solution form and an amount of the solid solution determines the peak wavelength of the light emitted.

The phosphor composition may include an absorbing ion as a sensitizer and charge compensator that absorbs exciting radiation and transfers it to an activator in the phosphor composition, the phosphor composition emits light having a wavelength longer than a wavelength of the exciting radiation, and the sensitizer comprises one or more ions chosen from $Li^+$, $Na^+$ and $K^+$ for the charge compensation.

A method for fabricating the phosphor composition includes the steps of: mixing $SrCO_3$, $Gd_2O_3$, $Al_2O_3$, $SrF_2$, $BaF_2$ and $CeO_2$ in stoichiometric amounts to form a mixture; and heating the mixture between 1000 and 1700° C. in a reduction atmosphere to form the phosphor composition. The heating step may comprise heating the mixture two or more times to achieve higher crystallinity for the phosphor composition as compared to heating the mixture just once, thereby enhancing one or more optical properties of the phosphor composition. The reduction atmosphere is provided by supplying a gas mixture having both nitrogen and hydrogen, and the hydrogen is 2 to 25% by volume, such that the hydrogen's volume in the gas mixture is 2-25% of the gas mixture's volume.

In both instances, the phosphors based upon the present invention showed a broad band emission from 430 to 760 nm when excited by existing InGaN-based blue LEDs and GaN-based long wavelength UV LEDs. Using the solid solution series phosphors based upon the present invention, these LEDs are expected to provide good color rendering properties with a wide spectral range and high efficiency for white lighting, when used for solid state lighting or as a backlight source for a liquid crystal display.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

In order to generate white light from LEDs, there are basically two strategies: the first approach is to mix different red, green and blue components from LED chips; and the second approach is to down-convert the emission from a blue LED or UV LED to a longer wavelength using a phosphor. In terms of cost, efficiency, and simple fabrication, the second method has been widely used for fabrication of white LEDs by coating yellow-emitting phosphors on blue LEDs, which is disclosed in International Patent No. WO98/05078 [16].

However, because the YAG:$Ce^{3+}$ phosphor has a relatively weak light emitting intensity in a red spectral region, it is difficult to obtain a good color rendering index (CRI). Furthermore, for display device applications, such as a backlight unit for an LCD, it is also important to obtain suitable color temperature using the phosphor. Thus, there is a need for the development of new phosphors, with high efficiency and high CRI, that can be manufactured easily and at low cost, with better thermal stability.

The present invention is concerned with solid solution phosphor series including $Ce^{3+}$-doped oxyfluoride phosphor materials as an end-member for solid-state lighting applications. In this regard, this invention can be used for white light generation by combining either a near UV-LED ($\lambda_{max}$=395 and 405 nm) and red-emitting phosphors, or a near UV-LED and green-orange phosphors, or a near UV-LED and yellow phosphors. Also this invention can be used for white light generation by combining either a blue LED and yellow phosphors, or a blue LED and green-yellow phosphors, or a blue LED and yellow-red phosphors. For this purpose, there are many numbers of different applications.

Technical Description

The inventors of the present invention reported a new yellow-emitting phosphor, $La_{1-x}Ce_xSr_2AlO_5$, for white-LED applications, which has a tetragonal structure with a space group I4/mcm (No. 140) with cell parameters a=6.8839(1) Å, c=11.0420(2) Å, as disclosed in U.S. Utility patent application Ser. No. 12/394,492, filed on Feb. 27, 2009 (now U.S. Pat. No. 8,163,203 issued on Apr. 24, 2012, by Won-Bin Im, Ram Seshadri and Steven P. DenBaars, entitled "YELLOW EMITTING PHOSPHORS BASED ON $Ce^{3+}$-DOPED ALUMINATE AND VIA SOLID SOLUTION FOR SOLID-STATE LIGHTING APPLICATIONS," which application is cross-referenced above and incorporated by reference herein.

The inventors of the present invention also reported a new green-emitting phosphor, $Sr_{3-x}Ce_xAlO_4F$, as disclosed in U.S. Utility patent application Ser. No. 12/816, filed on Jun. 16, 2010 (U.S. Pat. No. 8,344,611 issued on Jan. 1, 2013), by Won-Bin Im, Ram Seshadri and Steven P. DenBaars, entitled "OXYFLUORIDE PHOSPHORS AND WHITE LIGHT EMITTING DIODES INCLUDING THE OXYFLUORIDE PHOSPHOR FOR SOLID-STATE LIGHTING APPLICATIONS," which application is cross-referenced above and incorporated by reference herein.

Figure 1:
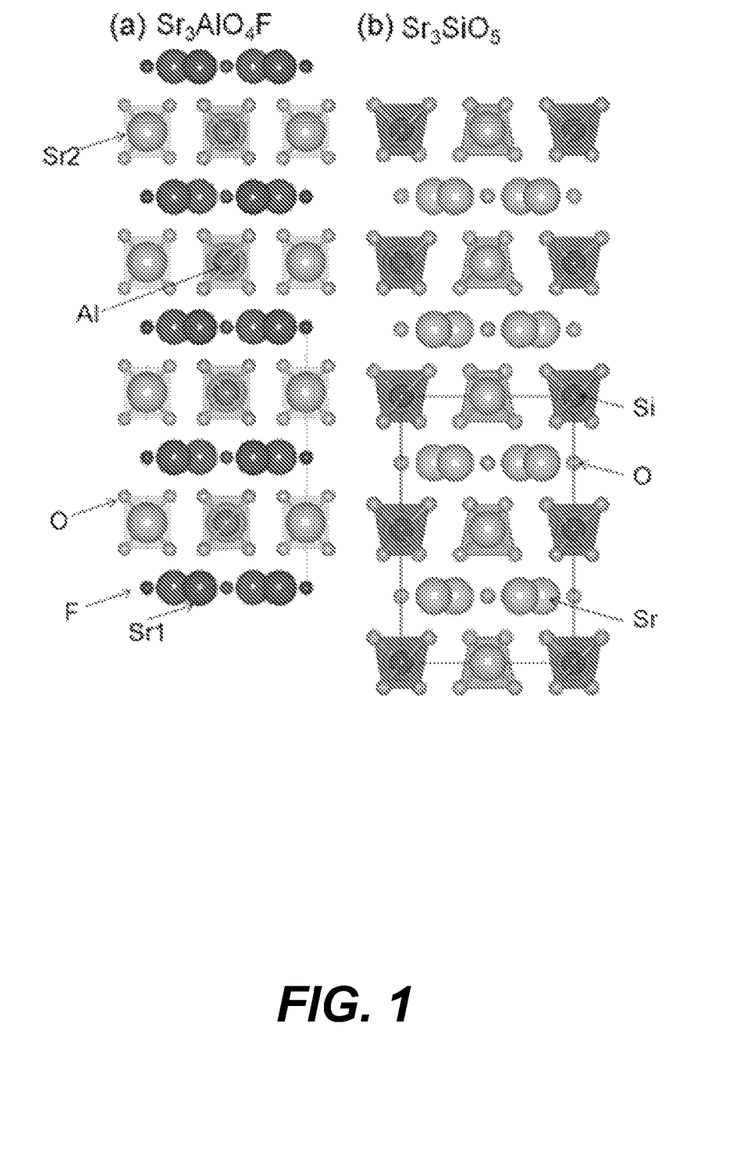
FIG. 1 shows views of the structures of end-member compounds in the solid solution series, viewed down the [010] direction of the unit cell, wherein FIG. 1(a) comprises $Sr_3AlO_4F$ and FIG. 1(b) comprises $Sr_3SiO_5$.

Meanwhile, $Sr_3AlO_4F$ is an isotypic compound with the general formula $Sr_3SiO_5$ (space group P4/ncc, No. 130) and $LaSr_2AlO_5$. As the present invention shows in FIG. 1, the structures are sufficiently closely related that a complete solid solution series is possible. Specifically, FIG. 1 shows views of the structures of end-member compounds in the solid solution series, viewed down the [010] direction of the unit cell, wherein FIG. 1(a) comprises $Sr_3AlO_4F$ and FIG. 1(b) comprises $Sr_3SiO_5$.

In order to obtain better optical properties with new compositions, the present invention synthesized two kinds of solid solution series between the nearly isotypic host compounds via solid solution. In an attempt to combine some of the attractive properties of the three distinct systems ($Sr_3AlO_4F$, $GdSr_2AlO_5$, and $Sr_3SiO_5$), the present invention remarkably enhanced the three systems' luminescent properties in the form of a solid solution. Furthermore, using the solid solution series between the three systems, the present invention tuned the three systems' optical properties depending on the amount of solid solution [12].

The present invention also uses a combination of a blue (or long UV) LED and yellow-emitting phosphors. In order to use a blue (or long UV) LED for white light generation, a yellow-emitting phosphor is coated on the LED, as disclosed in PCT International Application No. WO 98/05078 by Nichia [12].

Figure 2:
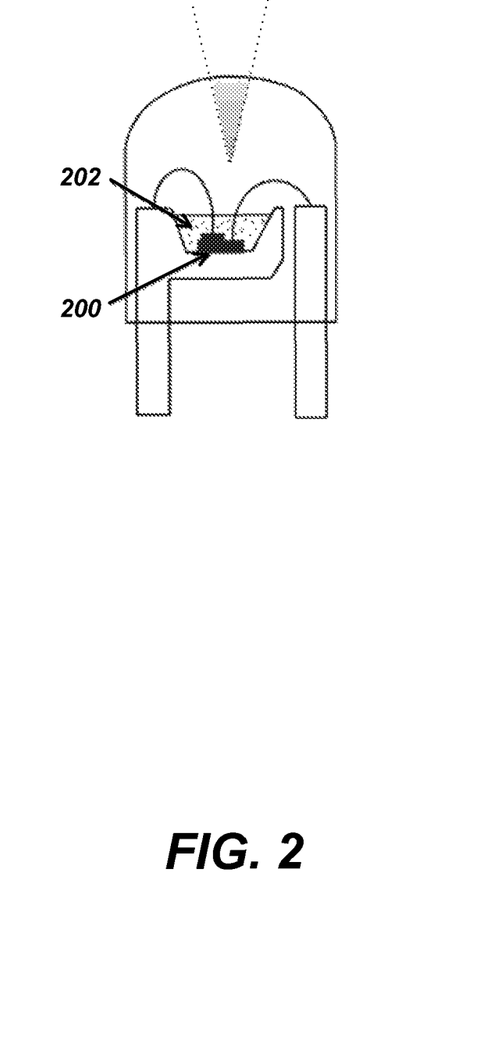
FIG. 2 is a schematic view of an LED using the solid solution phosphor series based on $Ce^{3+}$-activated oxyfluoride phosphor with various phosphor combinations.

FIG. 2 is a schematic view of an LED 200 using the solid solution phosphor series 202 based on $Ce^{3+}$-activated oxyfluoride phosphor with various phosphor combinations. White LEDs are fabricated using a near UV-LED (or blue LED) 200 having a dominant wavelength of (395 nm, 405 nm, 450 nm, or 460 nm) in combination with (e.g., coated with) the solid solution phosphor series 202. In order to obtain white LEDs emitting white light (illustrated in FIG. 2 by the cone of dotted lines), the solid solution series phosphors 202 can be further combined with either a red-emitting phosphor or a yellow and red-emitting phosphor. For this purpose, there are many numbers of different applications.

First Embodiment: Solid Solution Series Between $Sr_3AlO_4F$ And $Sr_3SiO_5$

Figure 3:
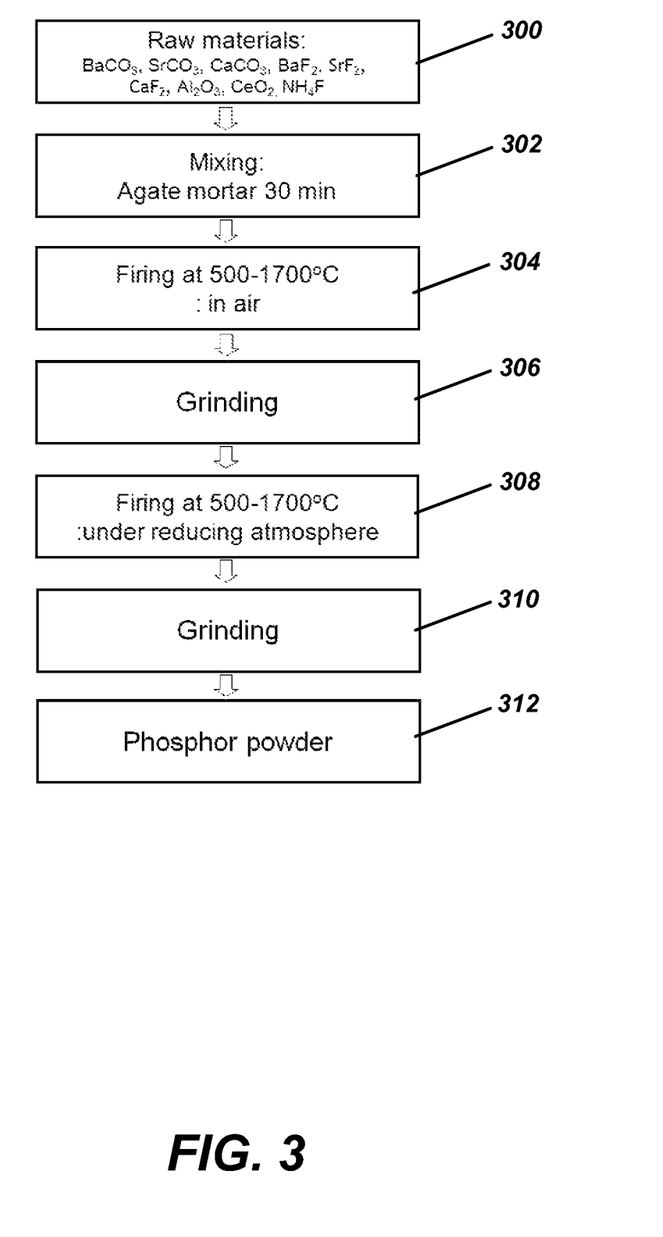
FIG. 3 illustrates an experimental procedure for fabricating a first embodiment of the present invention comprising a solid solution series between $Sr_3AlO_4F$ and $Sr_3SiO_5$.

FIG. 3 illustrates an experimental procedure for fabricating a first embodiment of the present invention comprising a solid solution series between $Sr_3AlO_4F$ and $Sr_3SiO_5$.

In order to synthesize $(Sr_{3-x-y}AR_y)(Al_{1-(z+u)}III_uSi_z)O_{4+z}F_{1-z}:Ce^{3+}_x$ phosphor samples, $CaCO_3$, $CaF_2$, $SrCO_3$, $SrF_2$, $BaCO_3$, $BaF_2$, $Al_2O_3$, $SiO_2$, $AlF_3$, $NH_4F$, $H_3BO_3$, $Ga_2O_3$, $In_2O_3$, $Sc_2O_3$, $CeF_3$ and $CeO_2$, were used as raw materials with stoichiometric amounts (300). In particular, carbonate or oxide of alkaline earth metals (AR), alumina ($Al_2O_3$) and cerium oxide ($CeO_2$), may be used. As a fluorine source, many materials may be used, for example, $SrF_2$, $BaF_2$, $NH_4F$, $CeF_3$ and $AlF_3$.

The raw materials were then mixed using an agate mortar for 30 minutes (mixing step 302) and the resulting mixture subsequently heated between 500 and 1700° C. in air (first firing step 304). The heated mixture was then ground (heated mixture subjected to a first grinding step 306).

The ground mixture was heated in a second firing step (308) under a reducing atmosphere. It is preferable that, in the second firing step (308), the reduction atmosphere be provided by supplying a nitrogen mixture gas whose hydrogen content is 2 to 25% by volume, on basis of the volume of mixture gas. In order to enhance the mixture's optical properties, it is possible to heat the mixture two or more times to obtain higher crystallinity of the phosphor powder sample as compared to heating the mixture just once.

After the second firing step (308), the heated mixture was ground (heated mixture subjected to a second grinding step 310) to obtain the phosphor powder (312).

In the preferred embodiment of the present invention, the raw materials of the phosphor are strontium carbonate ($SrCO_3$), strontium fluoride ($SrF_2$), alumina ($Al_2O_3$), silicon dioxide ($SiO_2$) and cerium oxide ($CeO_2$). As described above, Sr, Al and Si can be replaced by various elements such as Mg, Ca, Ba, B, Ga, In, Sc, Ge, Sn, etc., if required. The synthesis condition is the same as noted above.

FIGS. 4(a) and 4(b) show XRD patterns of $Sr_{2.975-q}Ce_{0.025}Al_{1-q}Si_qO_{4+q}F_{1-q}$, depending on the amount of q (q=0, 0.1, 0.3, 0.5, 0.7, 0.9 and 1.0), wherein FIG. 4(b) details the evolution of reflections near $2\theta=37°$, and expected reflection positions for the end-members are displayed above FIG. 4(a). Using the above experimental procedure of FIG. 3, the single phases of $Sr_{2.975-q}Ce_{0.025}Al_{1-q}Si_qO_{5-q}F_{1+q}$ phosphor samples were obtained.

Figure 4:
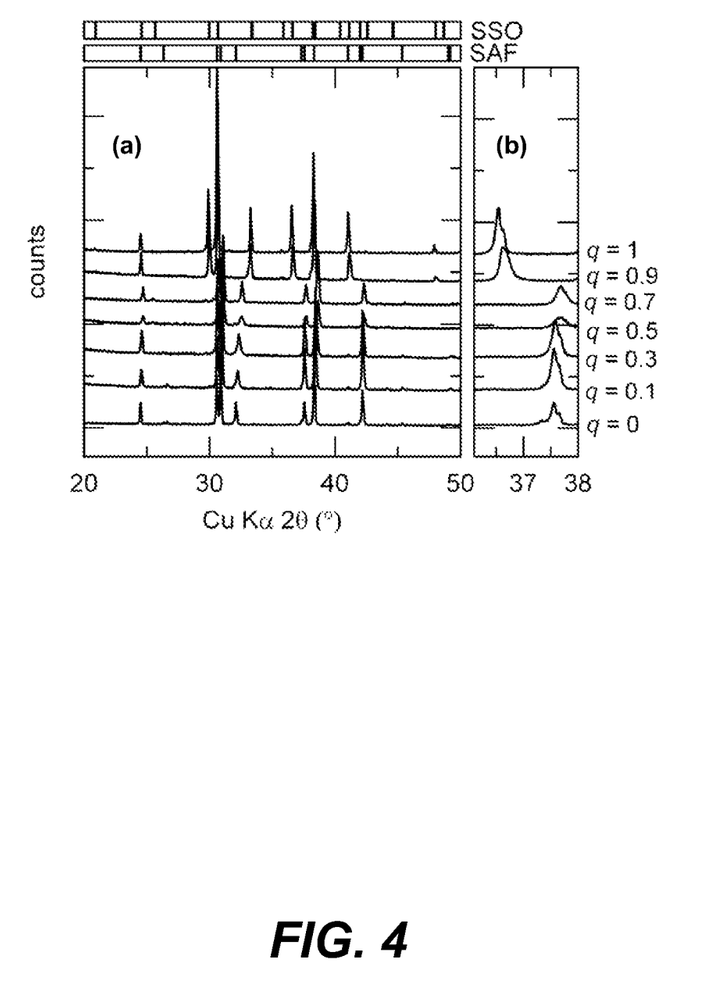
FIGS. 4(a) and 4(b) show XRD patterns of $Sr_{2.975-q}Ce_{0.025}Al_{1-q}Si_qO_{4+q}F_{1-q}$, depending on the amount of q (q=0, 0.1, 0.3, 0.5, 0.7, 0.9 and 1.0).

The XRD evolution of the $Sr_{2.975-q}Ce_{0.025}Al_{1-q}Si_qO_{4+q}F_{1-q}$ (q=0, 0.1, 0.3, 0.5, 0.7, 0.9 and 1.0) solid solutions all show a clean phase at room temperature, as shown in FIG. 4. The diffraction patterns of all samples were similar to that of the initial model of $Sr_3AlO_4F$ (SAF) or $Sr_3SiO_5$ (SSO) depending on q, with the transition from one structure to the other occurring beyond q=0.9. FIG. 4(b), which shows the reflections near $2\theta=37°$, clearly confirms the phase transition as a function of q.

Figure 5:
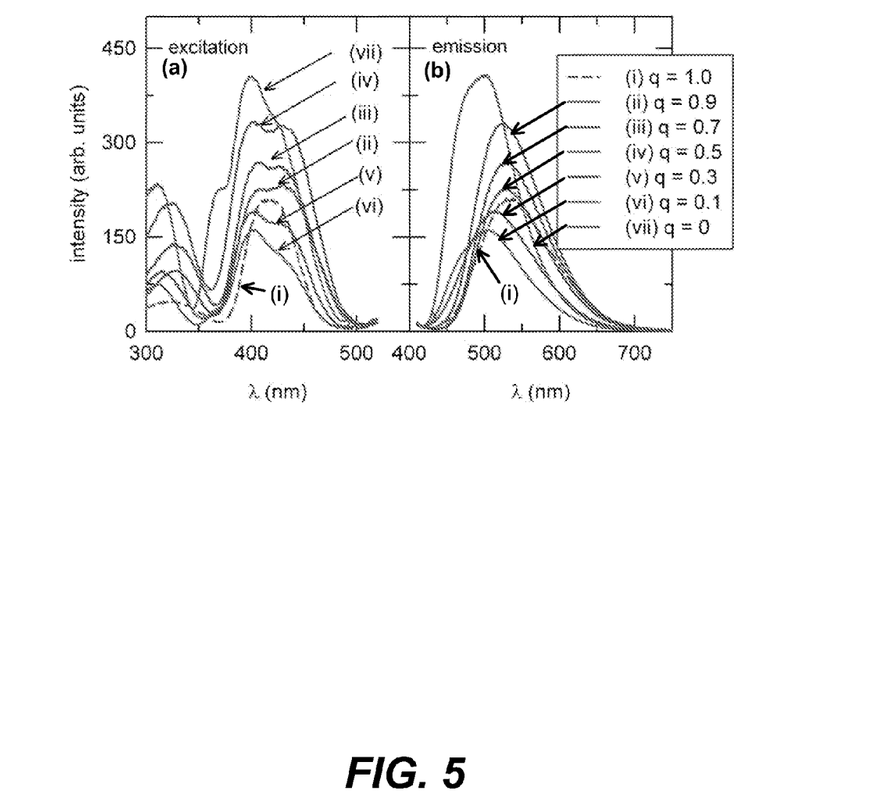
FIGS. 5(a) and 5(b) show excitation and emission spectra, respectively, of $Sr_{2.975-q}Ce_{0.025}Al_{1-q}Si_qO_{4+q}F_{1-q}$ (q=0, 0.1, 0.3, 0.5, 0.7, 0.9 and 1.0).

The luminescent property of the $Sr_{2.975-q}Ce_{0.025}Al_{1-q}Si_qO_{4+q}F_{1-q}$ (q=0, 0.1, 0.3, 0.5, 0.7, 0.9 and 1.0) solid solutions has a broad excitation band from 365 nm to 450 nm depending on the amount of solid solution q, as shown in FIGS. 5(a) and 5(b). Specifically, FIGS. 5(a) and 5(b) show excitation and emission spectra, respectively, of $Sr_{2.975-q}Ce_{0.025}Al_{1-q}Si_qO_{4+q}F_{1-q}$ (q=0, 0.1, 0.3, 0.5, 0.7, 0.9 and 1.0).

The relative photoluminescence (PL) intensities of $Sr_{2.975-q}Ce_{0.025}Al_{1-q}Si_qO_{4+q}F_{1-q}$ are listed in Table 1 set forth below. The relative PL compares emission intensity of a commercial YAG:$Ce^{3+}$ phosphor with data for $Sr_{2.975-q}Ce_{0.025}Al_{1-q}Si_qO_{4+q}F_{1-q}$ at room temperature (i.e., relative intensity=PL of $Sr_{2.975-q}Ce_{0.025}Al_{1-q}Si_qO_{4+q}F_{1-q}$ divided by PL of commercial YAG:$Ce^{3+}$). With increasing solid solution amounts q, the emission positions gradually moved to shorter wavelength, in the range from 537 nm to 503 nm.

TABLE 1

The optical properties for $Sr_{2.975-q}Ce_{0.025}Al_{1-q}Si_qO_{4+q}F_{1-q}$

| $Sr_{2.975-q}Ce_{0.025}Al_{1-q}Si_qO_{4+q}F_{1-q}$ (q) | Optical properties | |
|---|---|---|
| | Emission maximum (nm) | Relative intensity (%) |
| 0 | 503 | 150 |
| 0.1 | 503 | 63 |
| 0.3 | 514 | 59 |
| 0.5 | 525 | 132 |
| 0.7 | 527 | 106 |
| 0.9 | 529 | 89 |
| 1.0 | 537 | 83 |

Figure 6:
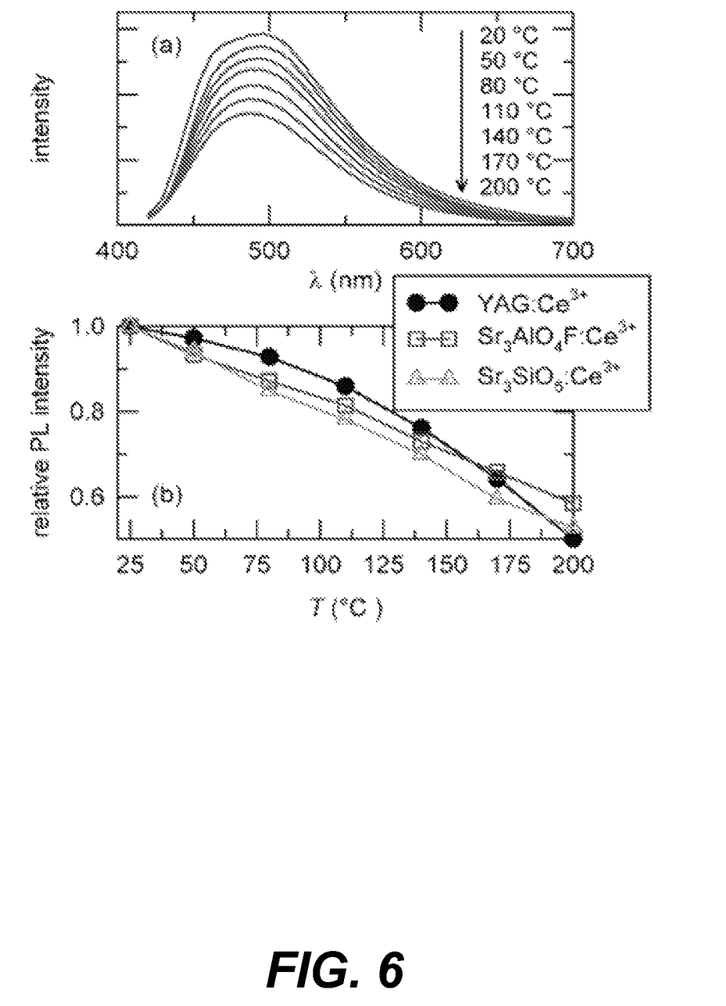
FIGS. 6(a) and 6(b) show temperature quenching characteristics of the present invention's phosphor powders, and commercial YAG:$Ce^{3+}$ phosphors, in the temperature range from 25 to 200° C.

FIGS. 6(a) and 6(b) show temperature quenching characteristics of the present invention's phosphor powders, and commercial YAG:$Ce^{3+}$ phosphors, in the temperature range from 25 to 200° C. Specifically, FIG. 6(a) shows emission spectra of $Sr_{2.975}Ce_{0.025}AlO_4F$ (q=0) with increased temperature in the range 25 to 200° C. and FIG. 6(b) shows temperature-dependent emission intensities. As the temperature increases from 25 to 200° C., the PL intensities of the phosphors decreased by 50%, 42%, and 48% of the initial PL intensity (measured for YAG:$Ce^{3+}$, q=0, and q=1.0).

Figure 7:
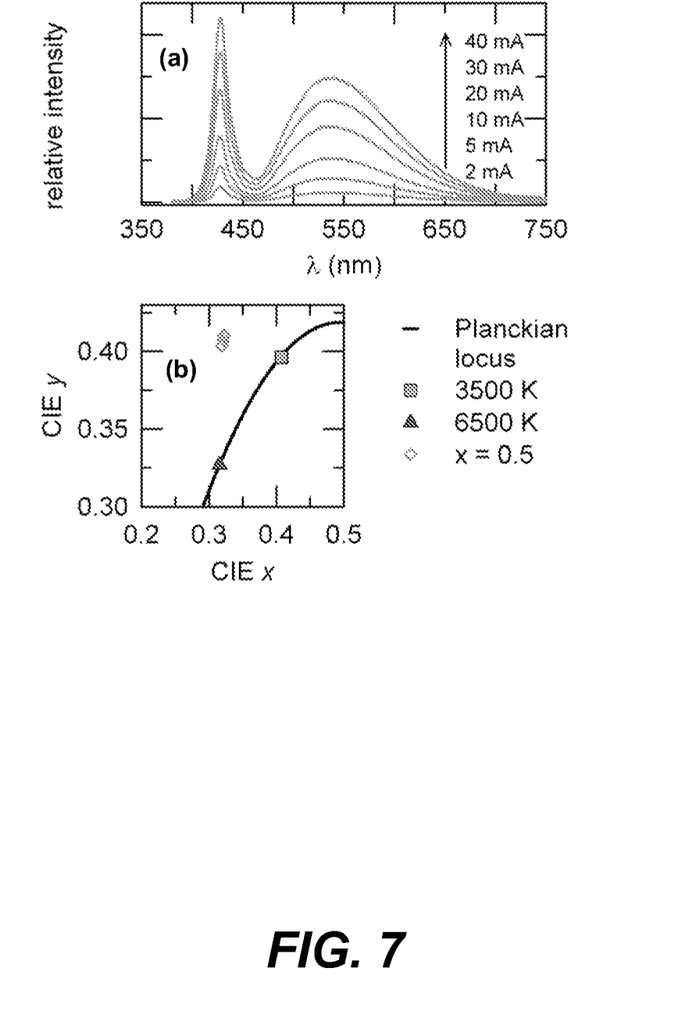
FIG. 7(a) shows the electroluminescence (EL) spectra from an InGaN LED (emitting a peak wavelength $\lambda_{max}$=430 nm) combined with a $Sr_{2.975}Ce_{0.025}Al_{0.5}Si_{0.9}O_{4.5}F_{0.5}$ phosphor (q=0.5) under different forward bias currents, in the range of 2-30 mA.
FIG. 7(b) shows the CIE chromatic coordinates for the same device under different forward bias currents.

FIG. 7(a) shows the electroluminescence (EL) spectra from an InGaN LED (emitting a peak wavelength $\lambda_{max}$=430 nm) combined with a $Sr_{2.975}Ce_{0.025}Al_{0.5}Si_{0.9}O_{4.5}F_{0.5}$ phosphor (q=0.5) under different forward bias currents, in the range of 2-40 mA, wherein the measured luminous efficiency was 15-30 lm/W depending on the current. FIG. 7(b) shows the CIE (International Commission of Illumination) chromatic coordinates for the same device under different forward bias currents, wherein the Planckian locus line and the points corresponding to color temperatures of 3500 K and 6500 K are indicated.

Second Embodiment: Solid Solution Series Between $Sr_3AlO_4F$ And $GdSr_2AlO_5$

Figure 8:
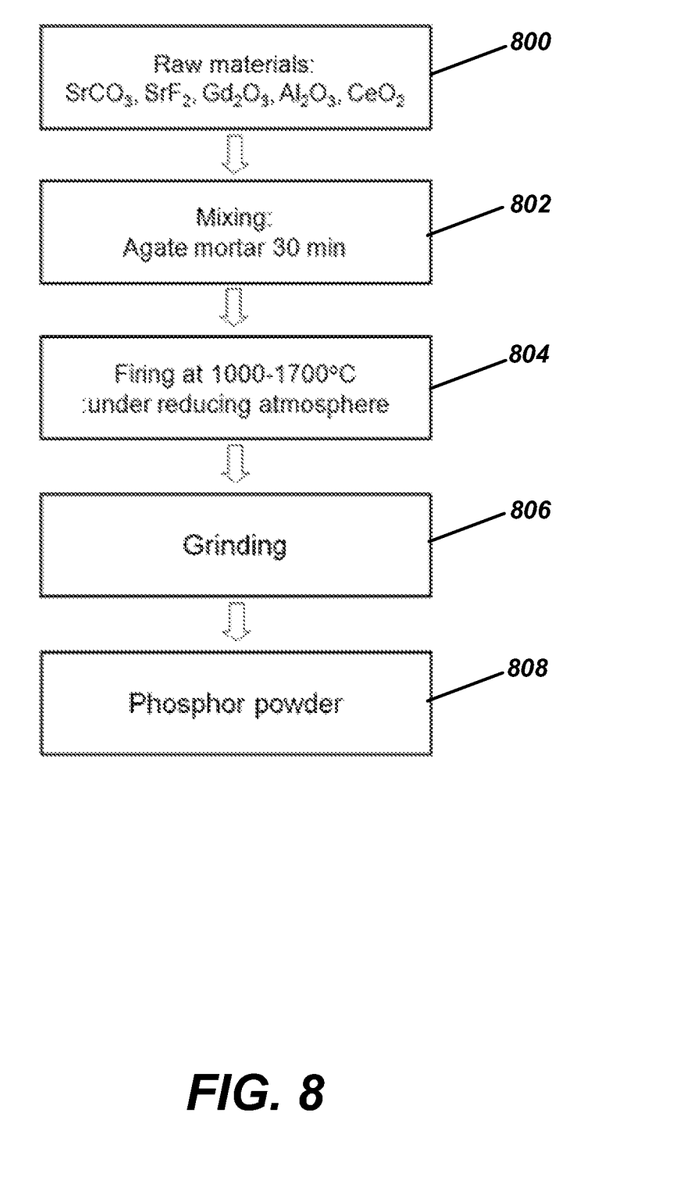
FIG. 8 illustrates an experimental procedure for fabricating a second embodiment of the present invention comprising a solid solution series between $Sr_3AlO_4F$ and $GdSr_2AlO_5$.

FIG. 8 illustrates an experimental procedure for fabricating a second embodiment of the present invention comprising a solid solution series between $Sr_3AlO_4F$ and $GdSr_2AlO_5$.

In order to synthesize $(Sr_{3-(a+b+c)}AR_bGd_{c-d}Ln_d)AlO_{4+c}F_{1-c}$:$Ce^{3+}_a$ phosphor samples, $CaCO_3$, $CaF_2$, $SrCO_3$, $SrF_2$, $BaCO_3$, $BaF_2$, $Al_2O_3$, $AlF_3$, $Gd_2O_3$, $La_2O_3$, $Tb_4O_7$, $Y_2O_3$ and $CeO_2$ were used as raw materials with stoichiometric amounts (800). In particular, carbonate or oxide of alkaline earth metals (AR), alumina ($Al_2O_3$), cerium oxide ($CeO_2$), and gadolinium oxide ($Gd_2O_3$) or terbium oxide ($Tb_4O_7$), may be used. As a fluorine source, many materials may be used, for example, $SrF_2$, $BaF_2$, $LaF_3$, $GdF_3$, $NH_4F$, $CeF_3$ and $AlF_3$.

The raw materials were then mixed using an agate mortar for 30 minutes (802) and the resulting mixture subsequently heated between 1000 and 1700° C. in a reduction atmosphere (804). In order to enhance the mixture's optical property or properties, the mixture may be heated two or more times to achieve higher crystallinity of the resulting phosphor powder sample as compared to heating the mixture just once. It is preferable that the reduction atmosphere be provided by supplying a nitrogen mixture gas whose hydrogen content is 2 to 25% by volume on basis of the volume of gas mixture.

After the firing step (804), the heated mixture was ground (grinding step 806) to form the phosphor powder (808).

In the preferred embodiment of the present invention, the raw materials of the phosphor are strontium carbonate ($SrCO_3$), gadolinium oxide ($Gd_2O_3$), alumina ($Al_2O_3$), and cerium oxide ($CeO_2$). As described above, Sr, La and Al can be replaced by various elements such a Mg, Ca, Ba, Tb, La, B, Ga, In, Sn, etc., if required. The synthesis condition is the same as noted above.

Figure 9:
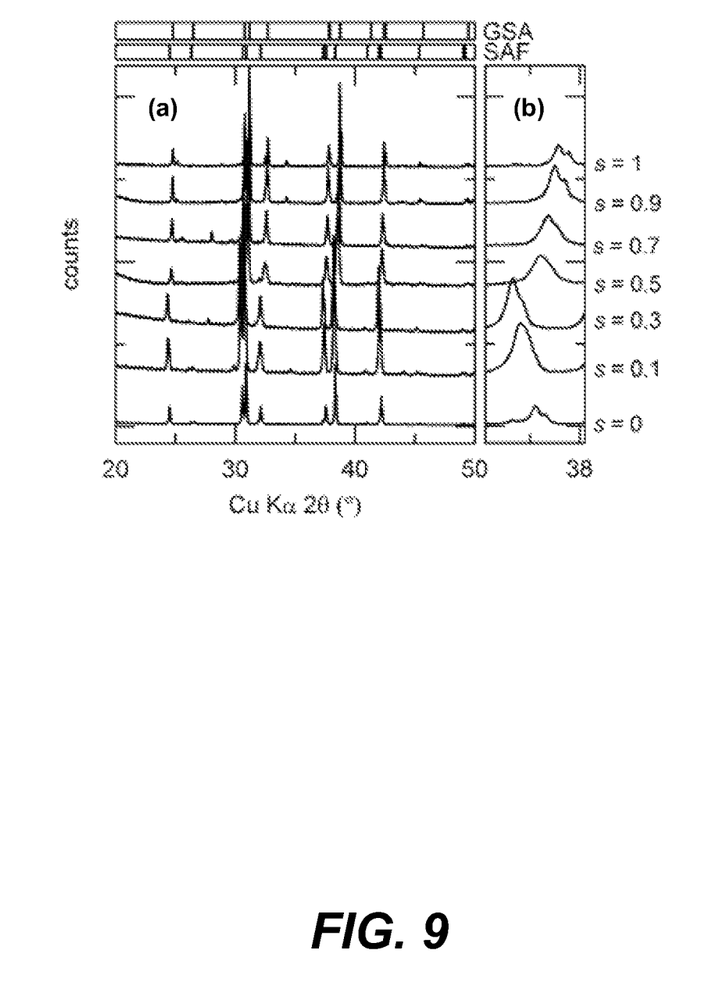
FIGS. 9(a) and 9(b) show XRD patterns of $Sr_{2.975-s}Ce_{0.025}Gd_sAlO_{4+s}F_{1-s}$, depending on an amount of s (s=0, 0.1, 0.3, 0.5, 0.7, 0.9 and 1.0).

FIGS. 9(a) and 9(b) show XRD patterns of $Sr_{2.975-s}Ce_{0.025}Gd_sAlO_{4+s}F_{1-s}$, depending on an amount of s (s=0, 0.1, 0.3, 0.5, 0.7, 0.9 and 1.0), wherein FIG. 9(b) details the evolution of reflections near $2\theta=37°$, and expected reflection positions for the end-members are displayed above FIG. 9(a). Using the above experimental procedure of FIG. 8, the single phases of $Sr_{2.975-s}Ce_{0.025}Gd_sAlO_{4+s}F_{1-s}$ phosphor samples were obtained. The diffraction patterns of all samples were similar to that of the initial model of $Sr_3AlO_4F$ or $GdSr_2AlO_5$, depending on s.

Figure 10:
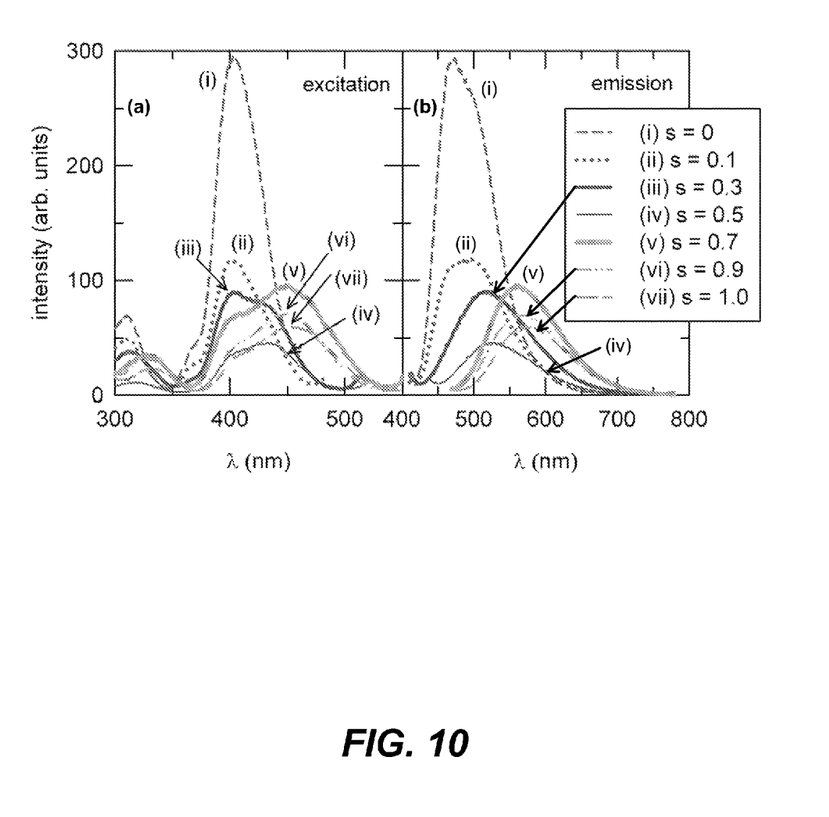
FIGS. 10(a) and 10(b) show excitation and emission spectra, respectively, of $Sr_{2.975-s}Ce_{0.025}Gd_sAlO_{4+s}F_{1-s}$ (s=0, 0.1, 0.3, 0.5, 0.7, 0.9 and 1.0).

The luminescent property of the $Sr_{2.975-s}Ce_{0.025}Gd_sAlO_{4+s}F_{1-s}$ (s=0, 0.1, 0.3, 0.5, 0.7, 0.9 and 1.0) solid solutions has a broad excitation band from 370 nm to 450 nm with a maximum from 400 to 450 nm, depending on the amount of solid solution s, as shown in FIGS. 10(a) and 10(b). Using the solid solution series between $Sr_3AlO_4F$ and $GdSr_2AlO_5$, the present invention tuned the $Sr_{2.975-s}Ce_{0.025}Gd_sAlO_{4+s}F_{1-s}$ excitation band and emission band, as expected. Specifically, FIGS. 10(a) and 10(b) show excitation and emission spectra, respectively, of $Sr_{2.975-s}Ce_{0.025}Gd_sAlO_{4+s}F_{1-s}$ (s=0, 0.1, 0.3, 0.5, 0.7, 0.9 and 1.0).

Possible Modifications

In the present invention, phosphor compositions are made with the following formulas.

(i) Solid Solution Series Between $Sr_3AlO_4F$ And $Sr_3SiO_5$:
$(Sr_{3-x-y}AR_y)(Al_{1-(z+u)}III_uSi_z)O_{4+z}F_{1-z}:Ce^{3+}_x$ wherein $0<x\leq 0.3, 0\leq y\leq 1, 0<z<1, 0<z+u<1$, AR includes at least one element selected from alkaline earth metals in the periodic table, for example, Mg, Ca and Ba, and III includes at least one atom selected from Al, B and Ga. A preparation method for a white light emitting LED using the present phosphor is also disclosed.

(ii) Solid Solution Series Between $Sr_3AlO_4F$ And $GdSr_2AlO_5$:
$(Sr_{3-(a+b+c)}AR_bGd_{c-d}Ln_d)AlO_{4+c}F_{1-c}:Ce^{3+}_a$ wherein $0<a\leq 0.3, 0\leq b\leq 3, 0<c<1, 0<d<1, 0<c-d<1, 0<a+b+c<3$, AR includes at least one element selected from alkaline earth metals in the periodic table, for example, Mg, Ca and Ba, and Ln includes at least one atom selected from lanthanide in the periodic table, for example, La, Tb and Y. A preparation method for a white LED using the present phosphor is also disclosed.

Efficiency of a phosphor comprising a host lattice may be enhanced by adding another ion to the host lattice, so that this ion may absorb the exciting radiation and subsequently transfer it to the activator. In this case, the absorbing ion is called a sensitizer. In this regard, a small amount of Pr, Nd, Sm, Eu, Dy, Ho, Er, Tm, Yb, Lu, Mn, Zn and Bi can be added to the host lattice as a sensitizer. A divalent ion may also be used as the sensitizers, wherein the divalent ion may comprise one or more ions chosen from the group comprising $Li^+$, $Na^+$ and $K^+$, for charge compensation.

In order to synthesize the present invention, it is possible to apply various methods, e.g., spray pyrolysis, co-precipitation, sol-gel method, solvothermal, hydrothermal method, etc. In order to enhance the optical property or properties of the present invention, the mixture of raw materials may be heated two or more times to obtain higher crystallinity of the sample as compared to heating the mixture just once.

The present invention may also be used with in various combinations to obtain white light generation from a white LED: a blue LED and yellow-emitting phosphors, or a blue LED and green-orange phosphors, or a blue LED and yellow-red phosphors, depending upon various color gamut needs. For example, a prototype white LED may comprise the present invention's phosphor samples applied or coated to a blue or GaN-based UV LED. As an additional step for white LEDs, the present invention's phosphor may be applied to InGaN-based blue LEDs and GaN-based UV LEDs in a chip packaging process. Furthermore, the luminescent properties of the present invention may be examined by various mixing ratios of epoxy resin and phosphor powder. The present invention may be optimized and the present invention's chemical composition may be changed for various applications.

Advantages and Improvements

The present invention provides new green and yellow emitting phosphor powders, and white light emitting LEDs which include the present invention's solid solution phosphors. In spite of the drawbacks of $Y_3Al_5O_{12}:Ce^{3+}$ ($YAG:Ce^{3+}$), there exist few competing phosphors which are excited by blue light (e.g., peak wavelength $\lambda_{max}$=450 and 460 nm) or near UV light ($\lambda_{max}$=395 and 405 nm) excitations. If the phosphors of the present invention are applied to InGaN-based blue LEDs and GaN based long wavelength UV LEDs, for example, good color rendering properties and high efficiency can be obtained from the combination of the present invention with various phosphors.

The present invention's compositions of solid solution series phosphors are completely different from those described in the literature, including any patents, because both end-members are the subject of patent applications first made by the inventors of the present invention. In particular, one of the end members of the present invention, the new yellow-emitting phosphor, $La_{1-x}Ce_xSr_2AlO_5$, was first developed and disclosed (along with white light emitting LED applications) in U.S. Utility patent application Ser. No. 12/394,492, filed on Feb. 27, 2009 (now issued as U.S. Pat. No. 8,163,203 issued on Apr. 24, 2012),by Won-Bin Im, Ram Seshadri and Steven P. DenBaars, entitled "YELLOW EMITTING PHOSPHORS BASED ON $Ce^{3+}$-DOPED ALUMINATE AND VIA SOLID SOLUTION FOR SOLID-STATE LIGHTING APPLICATIONS," which application is cross-referenced above and incorporated by reference herein. Another end-member of the present invention is the new green-emitting phosphor, $Sr_{3-x}Ce_xAlO_4F$, as disclosed in the previous invention, U.S. Utility patent application Ser. No. 12/816,939, filed on Jun. 16, 2010 (now issued as U.S. Pat. No. 8,344,611 issued on Jan. 1, 2013), by Won-Bin Im, Ram Seshadri and Steven P. DenBaars, entitled "OXYFLUORIDE PHOSPHORS AND WHITE LIGHT EMITTING DIODES INCLUDING THE OXYFLUORIDE PHOSPHOR FOR SOLID-STATE LIGHTING APPLICATIONS," which application is also cross-referenced above and incorporated by reference herein.

Thus, the invention is technically distinct from the reported green-emitting and yellow-emitting phosphors in terms of chemical composition. In the present invention, the tunability of emission color and excitation band with the change of host elements and the amount of solid solution, are very attractive properties for achieving the perfect white light generation. Furthermore, the most advantageous aspect of the present invention is that the solid solution phosphors showed much higher PL intensities than commercial $YAG:Ce^{3+}$ phosphors. Due to the attractive properties of the present invention, perfect white light LEDs, may be achieved by combining various phosphors with the present invention with high efficiency.

Appendix

Further information on the present invention can be found in the Appendix of parent U.S. Provisional Patent Application Ser. No. 61/256,830, entitled "SOLID SOLUTION PHOSPHORS BASED ON OXYFLUORIDE AND WHITE LIGHT EMITTING DIODES INCLUDING THE PHOSPHORS FOR SOLID WHITE LIGHTING APPLICATIONS," filed on Oct. 30, 2009, by Won-Bin Im, Ram Seshadri and Steven P. DenBaars, wherein the Appendix comprises a publication by Won Bin Im, Yoann Fourre, Stuart Brinkley, Junichi Sonoda, Shuji Nakamura, Steven P. DenBaars and Ram Seshadri, entitled "Substitution of oxygen by fluorine in the $GdSr_2AlO_5:Ce^{3+}$ phosphors: $Gd_{1-x}Sr_{2+x}AlO_{5-x}F_x$ solid solutions for solid state white lighting," which publication is incorporated by reference herein.

References

The following references are incorporated by reference herein.

[1] D. Haranath, H. Chander, P. Sharma, S. Singh, Appl. Phys. Lett. 2006, 89, 173118.

[2] C.-H. Lu, R. Jagannathan, Appl. Phys. Lett. 2002, 80, 3608.

[3] R. Kasuya, A. Kawano, T. Isobe, H. Kuma, J. Katano, Appl. Phys. Lett. 2007, 91, 111916.

[4] H. S. Jang, W. B. Im, D. C. Lee, D. Y. Jeon, S. S. Kim, J. Lumin. 2007, 126, 371.

[5] Y. Chen, M. Gong, G. Wang, Q. Su, Appl. Phys. Lett. 2007, 91, 071117.

[6] R.-J. Xie, N. Hirosaki, K. Sakuma, Y. Yamamoto, M. Mitomo, Appl. Phys. Lett. 2004, 84, 5404.

[7] X. Piao, K. I. Machida, T. Horikawa, H. Hanzawa, Y. Shimomura, N. Kijima, Chem. Mater. 2007, 19, 4592.

[8] J. K. Park, M. A. Lim, C. H. Kim, H. D. Park, J. T. Park, S. Y. Choi, Appl. Phys. Lett. 2003, 82, 683.

[9] Y. Q. Li, A. C. A. Delsing, G. de With, H. T. Hintzen, Chem. Mater. 2005, 17, 3242.

[10] M. P. Saradhi, U. V. Varadaraju, Chem. Mater. 2006, 18, 5267.

[11] W. B. Im, Y.-I. Kim, N. N. Fellows, H. Masui, G. A. Hirata, S. P. DenBaars, R. Seshadri, Appl. Phys. Lett. 2008, 93, 091905.

[12] G. Blasse, W. L. Wanmaker, J. W. ter Vrugt, and A. Bril, *Philps. Res. Repts.,* 1968, 23, 189.

[13] H. S. Jang and D. Y. Jeon, Appl. Phys. Lett. 2007, 90, 041906.

[14] PCT Patent Publication No. WO/2009/0085467, published Apr. 2, 2009, by Stetne et al., and entitled "Yellow emitting $Ce^{3+}$ doped calcium silicate phosphor and white light emitting diodes including $Ce^{3+}$ doped calcium silicate."

[15] Korean Patent Application No. 10-2007-98275, filed Sep. 28, 2007.

[16] PCT Patent Publication No. WO/1998/005078, published Feb. 5, 1998, by Shimizu et al., entitled "Light Emitting Device and Display Device," and corresponding to PCT Patent Application Serial No. PCT/JP1997/002610, filed Jul. 29, 1997.

Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A phosphor composition, comprising:

$(Sr_{3-(a+b+c)}AR_bGd_{c-d}Ln_d)AlO_{4+c}F_{1-c}:Ce^{3+}_a$ wherein:
 $0 < a \leq 0.3$,
 $0 \leq b \leq 3$,
 $0 < c < 1$,
 $0 < d < 1$,
 $0 < c-d < 1$,
 $0 < a+b+c < 3$,
 AR includes at least one element selected from alkaline earth metals, and
 Ln includes at least one atom selected from lanthanides in the periodic table.

2. The phosphor composition of claim 1, wherein a, b, c and d are such that the phosphor composition emits light, having a wavelength between 430 nm and 760 nm and a peak wavelength that is yellow light or green light, when excited by blue or ultraviolet light having a wavelength between 370 nm and 450 nm, wherein the peak wavelength is tunable by varying x, y, z and u.

3. A solid-state lighting apparatus, comprising:
 A phosphor composition, comprising:

$(Sr_{3-(a+b+c)}AR_bGd_{c-d}Ln_d)AlO_{4+c}F_{1-c}:Ce^{3+}_a$ wherein:
 $0 < a \leq 0.3$,
 $0 \leq b \leq 3$,
 $0 < c < 1$,
 $0 < d < 1$,
 $0 < c-d < 1$,
 $0 < a+b+c < 3$,
 AR includes at least one element selected from alkaline earth metals, and
 Ln includes at least one atom selected from lanthanides in the periodic table; and
 a light emitting diode (LED), combined with the phosphor composition, that optically pumps the phosphor composition such that the phosphor composition emits yellow or green light.

4. The solid-state lighting apparatus of claim 3, further comprising one or more additional phosphors combined with the phosphor composition, wherein:
 a, b, c and d are such that the phosphor composition in combination with the one or more additional phosphors emits white light,
 the additional phosphors include one or more of: a yellow phosphor, a green-orange phosphor, and a yellow-red phosphor, and
 the LED optically pumps the phosphor composition and the additional phosphors.

5. The phosphor composition of claim 1, wherein the phosphor composition includes an absorbing ion as a sensitizer and charge compensator that absorbs exciting radiation and transfers it to an activator in the phosphor composition, the phosphor composition emits light having a wavelength longer than a wavelength of the exciting radiation, and the sensitizer comprises one or more ions chosen from $Li^{30}$, $Na^+$ and $K^+$ for the charge compensation.

6. The phosphor composition of claim 1, wherein the phosphor composition is in a solid solution form and an amount of the solid solution determines the peak wavelength of the emitted light.

7. A method for fabricating a phosphor composition defined as:

$(Sr_{3-(a+b+c)}AR_bGd_{c-d}Ln_d)AlO_{4+c}F_{1-c}:Ce^{3+}_a$

Wherein:
 $0 < a \leq 0.3$, $0 \leq b \leq 3$, $0 < c < 1$, $0 < d < 1$, $0 < c-d < 1$,
 $0 < a+b+c < 3$,
 AR includes at least one element selected from alkaline earth metals, and
 Ln includes at least one atom selected from lanthanides in the periodic table,
 the method comprising the steps of:
 mixing raw materials in stoichiometric amounts to form a mixture; and
 heating the mixture between 1000 and 1700° C. in a reduction atmosphere to form the phosphor composition.

8. The method of claim 7, wherein the heating step comprises heating the mixture two or more times to achieve higher crystallinity for the phosphor composition as compared to heating the mixture just once, thereby enhancing one or more optical properties of the phosphor composition.

9. The method of claim 8, wherein the reduction atmosphere is provided by supplying a gas mixture having both nitrogen and hydrogen, and the hydrogen is 2 to 25% by volume, such that the hydrogen's volume in the gas mixture is 2-25% of the gas mixture's volume.

* * * * *